United States Patent [19]

Williams et al.

[11] Patent Number: 5,098,119

[45] Date of Patent: Mar. 24, 1992

[54] SEMI-ACTIVE SUSPENSION SYSTEM WITH ENERGY SAVING

[75] Inventors: Daniel E. Williams, Stuart; Mark D. Morris, Hobe Sound, both of Fla.

[73] Assignee: TRW Inc., Lyndhurst, Ohio

[21] Appl. No.: 673,680

[22] Filed: Mar. 22, 1991

[51] Int. Cl.$^5$ .................... B60G 11/26; B60T 11/26
[52] U.S. Cl. ............................ 280/707; 280/714; 60/585; 92/151
[58] Field of Search .......... 280/707, 698, 714, 6,12, 280/702, 709; 267/DIG. 1; 60/585; 92/151

[56] References Cited

U.S. PATENT DOCUMENTS

| | | | |
|---|---|---|---|
| 2,885,202 | 5/1959 | Trumper | 280/6.12 X |
| 3,778,081 | 12/1973 | Takahashi et al. | 280/714 X |
| 3,895,816 | 7/1975 | Takahashi et al. | 280/6.12 X |
| 4,743,000 | 5/1988 | Karnopp | 267/218 |
| 4,852,863 | 8/1989 | Breitenbacher et al. | 267/218 |

FOREIGN PATENT DOCUMENTS

| | | | |
|---|---|---|---|
| 1480280 | 10/1969 | Fed. Rep. of Germany | 280/702 |
| 1437253 | 11/1988 | U.S.S.R. | 280/707 |

Primary Examiner—Charles A. Marmor
Assistant Examiner—Paul Dickson
Attorney, Agent, or Firm—Tarolli, Sundheim & Covell

[57] ABSTRACT

A semi-active suspension system having a linear actuator operatively connected between a sprung mass and an unsprung mass of the vehicle for each corner of the vehicle. An accumulator connected to the actuator through an electrically controlled valve. An actuatable fluid RAM is in fluid communication with the accumulator for controlling fluid pressure in the accumulator. A hydraulic ram driver is operatively connected to the RAM. A sensor senses force inputs to the vehicle. A controller controls (i) the ram driver for pressurizing the accumulator to a desired fluid pressure, and (ii) the electrically controlled valve in response to sensed force input so as to effect a fluid pressure change in the actuator. Each fluid RAM includes a hydraulic motor having a housing and a piston slidably mounted in the housing. The piston divides the housing into two variable volume fluid chambers, one fluid chamber in fluid communication with the accumulator and a second fluid chamber in communication with the second fluid chambers of each RAM of the other corners of the vehicle. This arrangement permits movement of the piston of the fluid RAM with reduced energy.

11 Claims, 3 Drawing Sheets

SEMI-ACTIVE SUSPENSION SYSTEM WITH ENERGY SAVING

TECHNICAL FIELD

The present invention is directed to an apparatus for controlling relative motion between an unsprung mass and a sprung mass of a vehicle and is particularly directed to a semi-active suspension system having an energy saving feature.

BACKGROUND ART

Vehicle suspension systems are well known in the art. Such suspension systems have as their goal the control of the relative motion between the sprung (chassis) mass and unsprung (associated tire) mass of the vehicle. Suspension systems are classified as either passive, semi-active, or active.

Passive suspension systems dissipate energy produced when a vehicle is driven over an irregular road surface. Such systems provide good vibration isolation. A linear response of a passive suspension system can be altered by (i) adding an advantageous nonlinear attribute, such as direction dependant damping, and (ii) minimizing an objectionable effect, such as stiction. Passive systems, however, react only to applied forces from below through the road surface and from above through inertia of the sprung mass or vehicle body. Ideally, a suspension system should appear "soft" in reacting to road noise inputs and stiff when reacting to inertia inputs. Since a passive system cannot distinguish between the two, an engineering compromise is made.

An active suspension system uses power from the vehicle engine to actively move the vehicle wheels over an irregular road surface. Rather than a shock absorber, as is found in passive suspension system, an active suspension system uses a hydraulic servo-actuator, i.e., a hydraulic motor, to move the vehicle wheel. A plurality of sensors are located at various vehicle locations. A controller, e.g., a microcomputer, monitors the sensor outputs and controls operation of the hydraulic actuator through an electrically controlled servo valve. Through a control algorithm, the controller controls reaction to road noise and inertia inputs and controls relative motion of the sprung and unsprung masses.

In an active suspension system, the servo valve and controller function as an energy control device. The servo valve connects the energy source, i.e., a pump, to the energy consumer, i.e., an actuator. The difference between power in and power out is converted to heat energy by the servo valve.

In a fully active suspension system, the actuator is operated so as to move the wheel up and down relative to the vehicle body as necessary to provide a desired "ride feel" and "handling characteristic" of the vehicle. The hydraulic pump provides energy in terms of fluid flow at system pressure. The servo valve removes energy at a rate to provide fluid flow and pressure so as to move the wheel at a velocity needed to achieve the desired ride feel and handling characteristics. Control of fluid flow controls actuator velocity. Control of fluid pressure controls actuator force.

In a typical fully active suspension system, each corner i.e., each wheel, of the vehicle has an associated actuator and servo valve. The power consumption of each corner is the product of the fluid flow to the actuator times the supply pressure. Road noise occurs at high frequencies. Large strut velocities are often required to prevent large inputs from effecting commensurate motion of the vehicle chassis. Such large velocities requires that a large amount of energy. Since the hydraulic pump is driven by the vehicle engine, a large amount of energy consumed by the active suspension system means that a large amount of energy is being drained from the vehicle engine.

It is therefore desirable to develop a suspension system that provides better ride and handling control than a passive system but does not consume the energy required by a fully active suspension system.

SUMMARY OF THE INVENTION

Inputs to a vehicle suspension system can be characterized as load aiding and load opposing. Inputs are load aiding if the differential pressure in the actuator is consistent with the drive signal or velocity demand so that, if an orifice connected the two fluid chambers of the actuator together, the desired actuator motion would occur, i.e., actuator motion would occur passively. For example, if an external force on the actuator is acting in compression, and the drive signal is "telling" the actuator to compress, the actuator is said to be in a load aiding situation.

Inertia loading is always load opposing and road inputs have both load aiding and load opposing modes. Therefore, there are significant portions of the suspension system's duty cycle where a passive system would suffice. Furthermore, there are road input modes that are load aiding and in which a fully active suspension system operates very inefficiently.

The present invention provides an improved suspension system that is semi-active. The suspension system, in accordance with the present invention, provides active control of the suspension, i.e., connection with the pump, for low frequency input control and passive control, i.e., no connection with the pump, for high frequency input control. This arrangement provides energy saving in the operation of the suspension system. Also, the present invention provides an arrangement that moves the actuator in a low frequency mode with less fluid flow from the pump than was heretofore possible and, therefore, with less energy.

In accordance with the present invention, a suspension system for a vehicle comprises at least two adjustable wheel corners, each adjustable corner including a linear actuator operatively connected between a sprung mass and an unsprung mass of the vehicle. The linear actuator is actively movable in at least one direction in response to applied fluid pressure. The system further includes an electrically controlled valve and an accumulator connected to its associated actuator through its associated electrically controlled valve. An actuatable fluid RAM is in fluid communication with its associated accumulator for controlling fluid pressure in its associated accumulator. Movement of the RAM in one direction increasing fluid pressure in its associated accumulator and movement of the RAM in another direction reducing fluid pressure in its associated accumulator. Each fluid RAM includes a hydraulic motor having a housing and a piston slidably mounted in the housing, the piston divides the housing into two variable volume fluid chambers. One fluid chamber is in fluid communication with its associated accumulator and a second fluid chamber in communication with the second fluid chamber of each RAM of the other at least one corner of the vehicle. Ram driver means is operatively connected to its associated fluid RAM for moving said piston of said actuatable fluid RAM. Sensing means is provided for sensing force inputs to the vehicle. Control means is connected to each the electrically controlled valves, the ram driver means, and to the sensing means for controlling (i) each the ram driver means for moving the piston of their associated fluid RAM and thereby control fluid pressure in their associated accumulator, and (ii) each of the electrically controlled valves in response to sensed force inputs so as to apply fluid pressure to their associated actuator and thereby alter an effect of the force input to the vehicle.

The suspension system, in accordance with a preferred embodiment, includes a common accumulator in fluid communication with each second fluid chamber of the fluid RAMs. The suspension system further includes a pump and a pressure regulator connected to an output of the pump. An output of the pressure regulator is in fluid communication with the common accumulator.

The ram driver is preferably a hydraulic motor having a housing and a piston slidably received in its associated housing. The piston of the ram driver motor is connected to the piston of the fluid RAM. The working surface area of the piston of the ram driver motor is substantially smaller that the working surface area of the piston of the fluid RAM. The suspension system further includes an actuatable servo valve connected to the ram driver motor, to a source of fluid pressure, and to the controller. The controller controls movement of the ram driver piston by communication of fluid pressure from the source of fluid pressure to the ram driver motor. Movement of the ram driver piston controls movement of the piston of its associated fluid RAM.

In accordance with another feature of the present invention, the input sensor is a pressure sensor operatively connected to the linear actuator, the pressure sensor providing an electrical signal indicative of the fluid pressure in the linear actuator.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT

Figure 1:
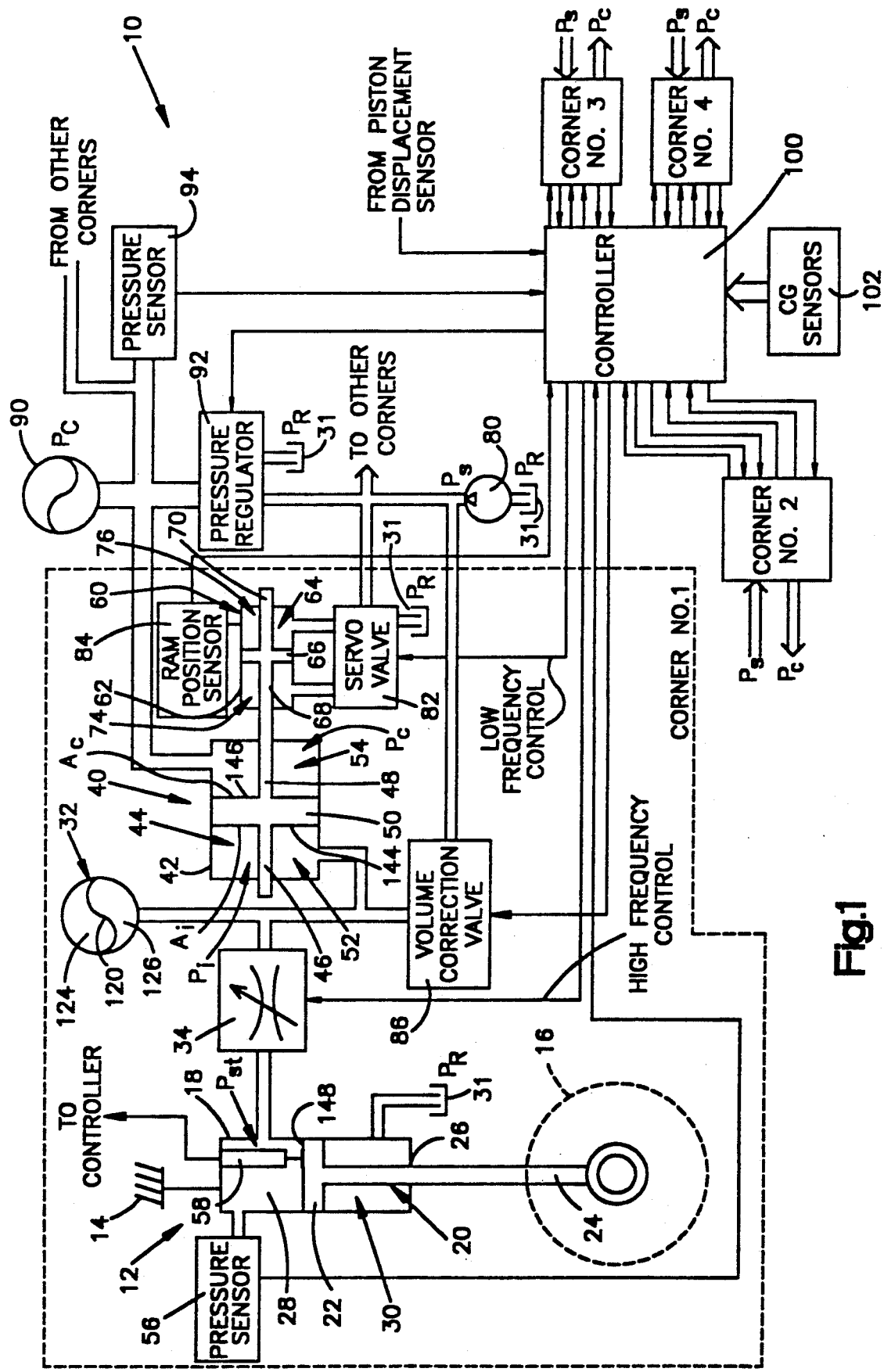
FIG. 1 is a schematic of an vehicle suspension system made in accordance with the present invention.

Referring to FIG. 1, a suspension system 10 for a vehicle includes four corners corresponding to the four wheel corners of the vehicle. Through out this disclosure, the structure and operation of only one corner is described, it being understood that the structure and operation of the other three corners is similar. In the corner shown, a linear actuator 12 operative connects the sprung mass 14, i.e, the chassis, to the unsprung mass 16, i.e., the tire.

The actuator 12 includes a cylinder housing 18 connected to the chassis 14. A piston 20 is telescopically received in the cylinder 18. The piston 20 includes a piston head 22 and a piston rod 24. The piston rod end extends through one end 26 of the cylinder 18 is connected to the tire 16. The piston head 22 divides the cylinder 18 into two variable volume fluid chambers 28, 30. The actuator 12 is referred to in the art as an unequal area strut, i.e., the surface area of the piston head 22 facing the chamber 28 is not equal to the area of the piston head 22 facing the chamber 30.

The chamber 30 is in fluid communication with a reservoir 31. The chamber 28 contains pressurized hydraulic fluid. The chamber 28 is in fluid communication with an air over fluid accumulator 32 through an electrically controlled valve 34. A hydraulic RAM 40 includes a cylinder 42 and an equal area piston 44. The piston 44 includes piston rods 46, 48 connected respectively to opposite sides of a piston head 50. The piston head 50 divides the cylinder 42 into two variable volume fluid chambers 52, 54. The RAM 40 forms an equal area linear actuator.

The fluid chamber 52 is in fluid communication with the accumulator 32. If the piston 44 moves to the left, as shown in FIG. 1, the fluid pressure in the accumulator 32 increases. If the piston 44 moves to the right, as shown in FIG. 1, the fluid pressure in the accumulator 32 decreases. The hydraulic RAM 40, therefore, acts as a linear pump.

The fluid pressure inside of the chamber 28 is controlled in response to (i) the pressure inside of the accumulator 32, (ii) the opening of the electrically controlled valve 34, and (iii) the load between the road and the vehicle. A pressure sensor 56 is operatively connected to the chamber 28 and provides an electrical signal having a value functionally related to the pressure in the chamber 28. A displacement sensor 58 is operatively connected between the cylinder housing 18 and the piston 20. The displacement sensor 58 provides an electric signal having a value functionally related to the relative position between the cylinder housing and the piston and, in turn, between the chassis and the wheel. The displacement sensor 58 can be any of several known displacement sensors such as a linear differential transformer ("LVDT").

A hydraulic ram driver 60 is operatively connected to the fluid RAM 40. Specifically, the ram driver 60 includes a cylinder housing 62. A piston 64 is slidably received in the cylinder housing and includes a piston head 66 and piston rods 68, 70. The piston head 66 divides the ram driver 60 into two variable volume fluid chambers 74, 76. The piston rod 68 is connected to the piston rod 48 of the RAM 40.

Preferably, the surface area of the piston head 50 is equal to the surface area of the piston head 22 on the side of the chamber 18. The surface area of the piston head 66 is preferably one-half the surface area of the piston head 50.

The two variable volume fluid chambers 74, 76 of the ram driver 60 are connectable to an output of a hydraulic pump 80 through an electrically controlled servo valve 82. The servo valve 82 is connected to the reservoir 31. The input of the hydraulic pump 80 is connected to the reservoir 31.

The ram driver 60 is movable left or right, as viewed in FIG. 1, by directing pressurized fluid to the fluid chambers 76, 74 respectively. Motion of the piston 44 of the fluid RAM 40 and, in turn, pressure in the accumulator 32, are controlled by the position of the piston 64 of the ram driver 60. A ram position sensor 84 monitors the position of the piston 64 relative to the cylinder 60 and provides an electrical signal having a value functionally related thereto. The ram position sensor 84 can be any of several known position sensors such as a linear voltage differential transformer ("LVDT").

The pump 80 is in fluid communication with the accumulator 32 through an electrically controlled, volume correction valve 86. There is a certain amount of fluid leakage from chamber 28, around the piston head 22, and to the reservoir 31. The valve 86 is controlled in response to the sensed ride height from displacement sensor 58 so as to maintain a constant fluid volume in chamber 28, accumulator 32, and chamber 52. In an arrangement in which there is no fluid leakage around the piston head 22, the connection of the pump 80 to the accumulator 32 through valve 86 would be unnecessary.

The chamber 54 of each of the fluid RAMs 40 of the four vehicle wheel corners are in fluid communication with a central air over fluid accumulator 90. The central accumulator 90 is in fluid communication with the pump 80 through a pressure regulator 92. A pressure sensor 94 monitors the fluid pressure in the accumulator 90 and provides an electrical signal having a value functionally related to the monitored fluid pressure therein.

A controller 100, such as a microcomputer, is operatively connected to the pressure sensor 56, the electrically controlled damper valve 34, the servo valve 82, the displacement sensor 58, the volume correction valve 86, and the RAM position sensor 84 for each of the four corners. Also, the controller 100 is operatively connected to the pressure regulator 92 and the pressure sensor 94.

The controller 100 is further connected to a plurality of center-of-gravity ("CG") sensors 102. These CG sensors 102 are typically located at or near the center of the vehicle and detect low frequency motions of the vehicle. Such CG sensors 102 include yaw sensors, lateral accelerometers, longitudinal accelerometers, etc. The controller 100 monitors data output from all the vehicle sensors to which it is connected and controls pressure in the accumulator 32 and in the chamber 28 of each of the vehicle corners so as to control the vehicle suspension in response to sensed high frequency road inputs and low frequency inertia inputs.

Figure 2:
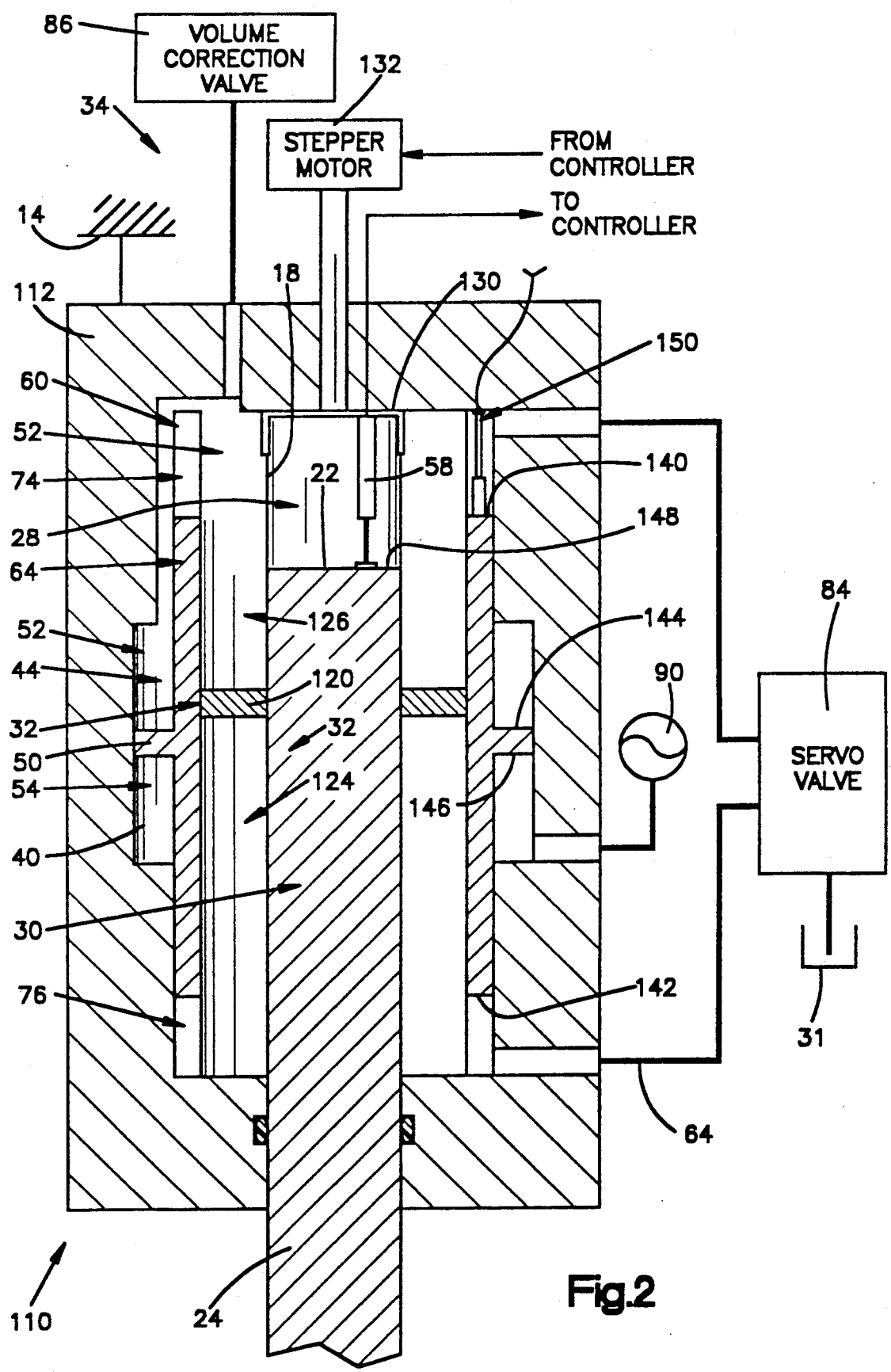
FIG. 2 is a sectional side view of a preferred actuator arrangement made in accordance with the present invention.

Referring to FIG. 2, a preferred embodiment of an actuator, Ram, ram driver construction is shown in a single assembly 110. Each corner of the vehicle has such an assembly 110. For purposes of clarity, only one such corner assembly is described in detail. Numerical designations used in FIG. 1 are also used in FIG. 2 where possible so as to aid in matching elements between the two figures for a clearer understanding.

A housing 112 is secured to the chassis 14. The piston rod 24 is secured to the associated vehicle wheel. The piston rod 24 is slidably received in a first cylindrical chamber 18. A second cylindrical chamber 40 surrounds the cylindrical chamber 18.

The piston 44 includes the "piston head" 50 which divides the cylinder 40 into a fluid chamber 52 and a fluid chamber 54. The chamber 54 is in fluid communication with the central accumulator 90. An elastomeric bladder ring 120 separates the air portion 124 from the fluid portion 126 of accumulator 32. The fluid portion 126 of the accumulator 32 is in fluid communication with the fluid chamber 52. The volume correction valve 86 is in fluid communication with the fluid portion 126 of the accumulator 32.

A cylindrical chamber 60 is located within the chamber 40. Piston 64 divides the cylinder chamber 60 into two fluid chambers 74, 76. The chambers 74, 76 are in fluid communication with the servo valve 84. The accumulator 32 is in fluid communication with the chamber 28 through the electrically controlled valve 34.

The valve 34 takes the form of a variable rotary valve 130 operatively connected to a stepper motor 132. Rotation of the valve 130 by the stepper motor 132 controls the fluid communication between the accumulator 32 and chamber 28. It will be appreciated that any other type of electrically controlled servo valve may be used for control of the fluid communication between the accumulator 32 and the chamber 28.

The surface areas on the ends 140, 142 of piston 64 is one-half the area of surfaces 144, 146 of piston 54. The area of surfaces 144, 146 of piston 54 is equal to the surface area of the end 148 of the piston 20.

A position sensor 150, such as an LVDT is secured between the housing 112 and the ram driver piston 64. The LVDT sensor has an electrical characteristic that varies as a function of the position of the ram piston 64 relative to the housing. It should be appreciated that since the ram driver piston 64 is connected to the fluid RAM piston 44, the LVDT sensor provides an indication of the position of both the piston 64 and the piston 54.

Control of the semi-active suspension system depicted in FIGS. 1 and 2 includes three main tasks: regulation of the pressure $P_c$ common to the four fluid RAMs 40, control of the position of the pistons 54 of the fluid RAMs 40, and control of the electrically controlled valves 34 for each of the four corners. The pressure $P_c$ is referred to herein as back pressure. This back pressure permits use of a piston in the ram driver that has a smaller surface area piston head. This, in turn, permits an energy savings.

With regard to the control of the back pressure $P_c$, the areas of the strut piston heads 22 (surface 148) and the accumulators 32, 90 are sized such that they all have the same heave natural frequency. With the present arrangement, there is no substantial change in the common volume for symmetrical displacements so the actual amount of flow through the regulator 92 is quite small when reacting to pitch and roll inputs. When reacting to a warp input or trying to simulate roll bar effects, the regulator 92 must provide flow to account for the differences in piston areas of the front corners to the rear corners, which is a function of the weight bias of the vehicle. In general, the control is simply a closed pressure loop. The pressure command is varied if the static weight of the vehicle changes due to passengers, luggage, or fuel. The control arrangement is to ensure that the actuator piston 20 driven by the associated valve 34 has sufficient authority in either direction. Assume that the pressure inside of chamber 54 is $P_c$, the area of surface 146 of the piston head 50 on the side of chamber 54 is $A_c$, the pressure in the chamber 52 is $P_i$, and the area of surface 144 of the piston head 50 on the side of chamber 52 is $A_i$. During a static condition when there is no change in loading in the vehicle, there is no requirement for a pressure differential across the piston 44 to support the weight of the associated corner. Therefore:

$$P_i \times A_i = P_c \times A_c \qquad (1)$$

During a complex handling maneuver, the fluid RAM pressures $P_i$ for each of the four corners will not be equal. The summation of the four corners will be:

$$\sum_{i=1}^{4} (P_i \times A_i) = 4 \times (P_c \times A_c) \quad (2)$$

Solving equation number 2 for $P_c$ yields:

$$P_c = \frac{\sum_{i=1}^{4} (P_i \times A_i)}{4 \times A_c} \quad (3)$$

The static height of the vehicle may be controlled by varying $P_c$ in response to a sensed operating characteristic of the vehicle. For example, to reduce drag at highway speeds, the height of the vehicle can be lowered by lowering $P_c$.

The volume correction valve 86 is controlled by the controller 100 for ride height correction as well as maintaining a constant fluid volume in chamber 28, accumulator 32, and chamber 52. Volume correction is necessary because of the fluid leakage around piston head 22. The controller tries to maintain a constant mean average value of the ride height. The ride height is monitored by controller 100 through the sensor 58. The sensor 58 is also used to detect a system failure.

Control of the position of piston 44 of the fluid RAM 40 provides control for response to low frequency or inertia inputs to the system. For example, when the vehicle rounds a corner, inertia forces transfer loading from the inside of the vehicle to the outside of the vehicle. As weight is transferred, strut displacements change according to the apparent stiffness of the accumulator 32. An increase in pressure $P_{st}$ in the chamber 28, compresses the gas in portion 124 of accumulator 32 by a certain volume. The piston 44 of the fluid RAM 40 is moved so as to compensate for the volume displacement in the accumulator 32 due to the change in pressure $P_{st}$.

The simplest control of the position of piston 44 of the fluid RAM 40, in accordance with one embodiment of the present invention, is to control the position of piston 44 in response to a filtered pressure signal $P_{st}$ from the associated actuator 18. A look-up table within the internal ROM memory of the controller 100 lists position of piston 44 of the fluid RAM 40 as a function of sensed pressure $P_{st}$ in the actuator. Displacement control for the fluid RAM 40, in accordance with such a control scheme, provides a command signal to the associated servo valve 82 in response to the value listed in the look-up table corresponding to the desired pressure $P_{st}$.

In accordance with another embodiment of the present invention, the position of the piston 44 the fluid RAM 40 is controlled in response to accelerometer signals from the CG sensors 102. Such a control arrangement permits control of the vehicle warp so as to provide a desirable handling effects, e.g., the amount of oversteer or understeer.

In accordance with a preferred embodiment, both of the methods set forth in the proceeding two paragraphs are used to control position of the piston 44 of the fluid RAM 40. In pitch and roll control, the position commands for piston 44 are derived from the filtered pressure signals $P_{st}$ from the actuators. The position commands derived from filter pressure signals vary in accordance with a desired warp effect.

Control of the electrically controlled valves 34 for high frequency inputs is depended upon the operating speed of the valve itself. If the valve 34 has a "slow" operating time, i.e., greater that fifty milliseconds, the valve opening is controlled in response to an estimate of the roughness of the road surface and an estimate of the handling inputs. Handling inputs can be characterized either from the accelerations sensed by the CG sensors 102 or directly from steering input sensors while road roughness is derived from variation in the pressure $P_{st}$ in the actuators 18.

If the operating speed of the valve 34 is less than 10 milliseconds, control of the valve is accomplished with sensed specific road inputs.

Figure 3:
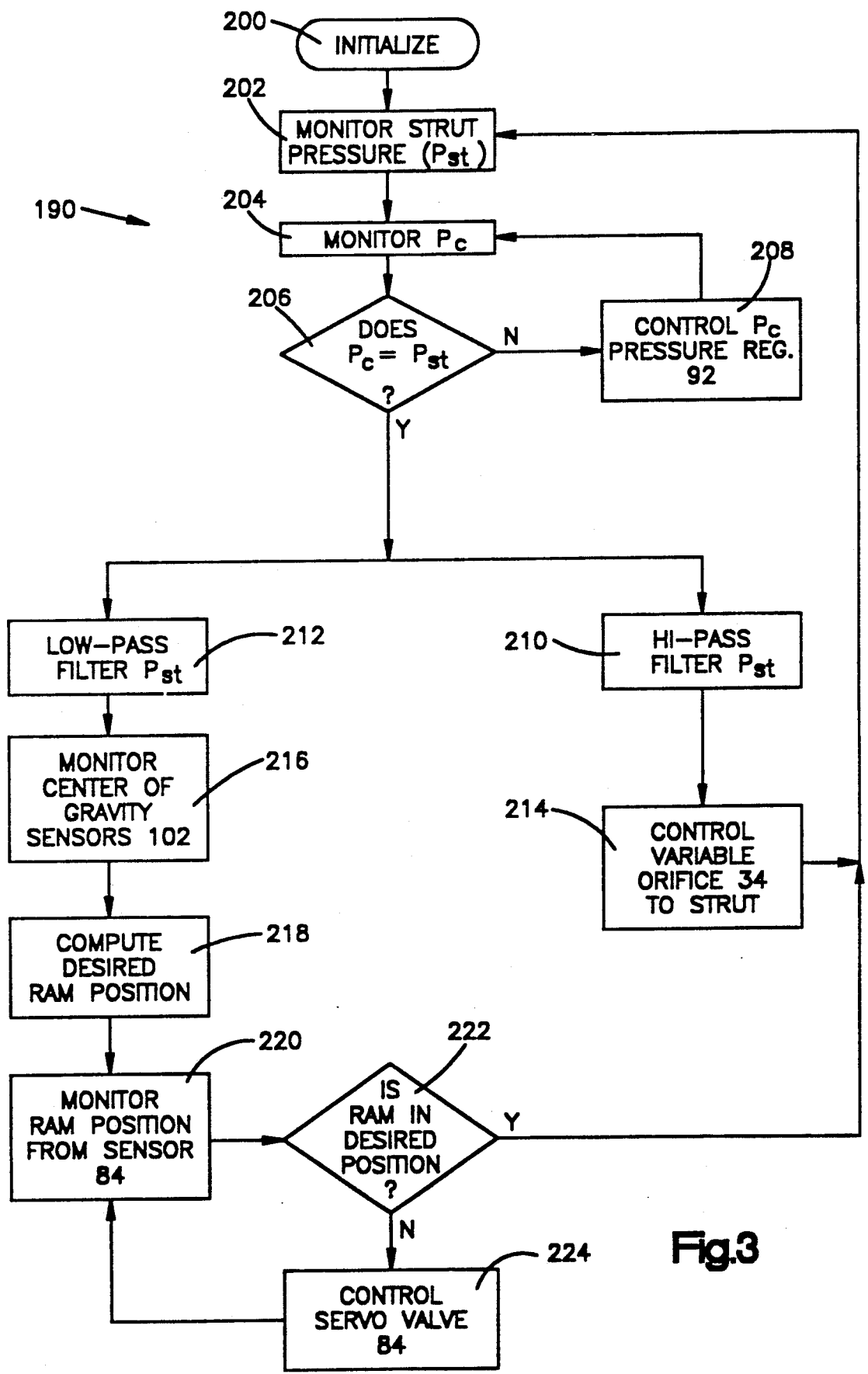
FIG. 3 is a flow diagram of a control process for the vehicle suspension system shown in FIG. 1.

Referring to FIG. 3, a control process 190 followed by the controller, in accordance with a preferred embodiment of the present invention, is depicted In step 200, the controller is initialized upon power up of the vehicle. In step 202, the pressure $P_{st}$ in each of the four actuators or struts 18 is monitored by the controller. In step 204, the back pressure $P_c$ is monitored by the controller. In step 206, the controller makes a determination as to whether $P_c$ is equal to $P_{st}$. If the determination is negative, the process proceeds to step 208 where the pressure regulator 92 is controlled according so as to make the $P_c$ equal to $P_{st}$. The process then loops back to set 204. If the determination in step 206 is affirmative, the process proceeds to steps 210 and step 212.

In step 210, the controller mathematically hi-pass filters the monitored pressure signal $P_{st}$. It will be appreciated that an analog hi-pass filter can be used between the sensor 56 and the controller 100. In step 214, the controller controls the variable orifice 34 so as to either increase or decrease pressure in the actuator 18 in accordance with a preprogrammed control arrangement for responding to a high frequency road input. The process then loops back to step 202.

In step 212, the controller mathematically low-pass filters the monitored pressure signal $P_{st}$. It will be appreciated that an analog low-pass filter can be used between the sensor 56 and the controller 100. In step 216, the controller 100 monitors the CG sensors 102. In step 218, the controller 100 computes the desired position of the piston 44 of the fluid RAM 40 in accordance with a preprogrammed response to the CG sensors. For example, the control can provide either oversteer or understeer. In accordance with another embodiment of the present invention, the desired position of piston 44 of the fluid RAM 40 is determined from a look-up table stored in the controller's ROM based upon the low pass filter signal of $P_{st}$.

The process proceeds to step 220 where the position of the piston 44 of the fluid RAM 40 is monitored. In step 222, the controller makes a determination as to whether the fluid RAM piston 44 is in the desired position, i.e., does the computed or looked-up position match the monitored position? If the determination in step 222 is affirmative, the process loops back to step 202. If the determination in step 222 is negative, the process proceeds to step 224 where the servo valve 82 is controlled so as to move the piston 44 of the fluid RAM 40 to the desired position. The process then loops back to step 220.

When the suspension system moves the linear actuators 12 of the four corners in response to a low frequency input, e.g., roll, pitch, passenger loads, luggage, etc., there is substantially no change in the total system fluid in the RAMs 40. This result is due to the common fluid connection of the RAMs 40. It is the common connection of the back side of the RAMs that permits the surface area of the piston head 66 of the associated ram drivers 60 to be substantially smaller than the piston heads 50 of their associated fluid RAM 40. Since power is equal to fluid flow times pressure, it takes less power to move the piston 44 of each fluid RAM 40 through their associated ram driver 60 than if the pump 80 was directly connected to the fluid RAM 40. Therefore, a suspension system made in accordance with the present invention provides an energy savings over other systems.

If the design of the actuators 12 are of the type that have fluid leakage past the piston heads 22, the controller 100, as part of the control process, determines if a fluid volume correction is needed in any of the corners. This is determined from the monitored ride height as determined by the displacement sensors 58. If fluid needs to be input to a corner so as to make the fluid volume for that corner constant, i.e., compensate for the fluid leakage, the associate valve 86 is opened accordingly.

In accordance with another embodiment of the present invention, the road roughness is determined through Fourier analysis or an "averaged" high-pass filter of the signal $P_{sr}$ from each of the pressure sensors for the actuators 12 for each of the corners of the vehicle. Signals from the CG sensors are monitored for handling characteristics such as signals indicative of the lateral acceleration of the vehicle and longitudinal acceleration of the vehicle. The orifice control signal to the associated valves 34 are provided in response to the road roughness determination and the handling determination.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. A suspension system for a vehicle comprising:
   at least two adjustable wheel corners, each adjustable corner including,
      a linear actuator operatively connected between a sprung mass and an unsprung mass of the vehicle, said linear actuator being actively movable in at least one direction in response to applied fluid pressure,
      an electrically controlled valve,
      an accumulator connected to an associated actuator through an associated electrically controlled valve,
      an actuatable fluid RAM in fluid communication with an associated accumulator for controlling fluid pressure in said associated accumulator, movement of said RAM in one direction increasing fluid pressure in said associated accumulator and movement of said RAM in another direction reducing fluid pressure in said associated accumulator, each fluid RAM including a hydraulic motor having a housing and a piston slidably mounted in said housing, said piston dividing said housing into two variable volume fluid chambers, one fluid chamber in fluid communication with said associated accumulator and a second fluid chamber in communication with the second fluid chambers of each RAM of the other at least one corner of the vehicle, and
      ram driver means operatively connected to an associated fluid RAM for moving said piston of said actuatable fluid RAM;
   sensing means for sensing force inputs to the vehicle;
   control means connected to each said electrically controlled valves, said ram driver means, and to said sensing means for controlling (i) each said ram driver means for moving said piston of an associated fluid RAM and thereby control fluid pressure in an associated accumulator, and (ii) each of said electrically controlled valves in response to sensed force inputs so as to apply said fluid pressure to their associated actuator and thereby alter an effect of the force input to the vehicle.

2. The suspension system of claim 1 further including a common accumulator in fluid communication with each second fluid chamber of said fluid RAMs.

3. The suspension system of claim 2 further including a pump and a pressure regulator connected to an output of said pump, an output of said pressure regulator being in fluid communication with said common accumulator.

4. The suspension system of claim 2 wherein each said ram driver means is a hydraulic motor having a housing and a piston slidably received in an associated housing, the piston of each said ram driver means being connected to said piston of an associated fluid RAM, the working surface area of said piston of said ram driving means being substantially smaller than the working surface area of the piston of said associated fluid RAM.

5. The suspension system of claim 4 wherein each ram driver means includes an associated actuatable servo valve connected to said associated ram driver means, to a source of fluid pressure, and to said control means, said control means controlling movement of said ram driver piston through passage of fluid pressure from said source of fluid pressure to said ram driver means which, in turn, controls movement of the piston of said associated fluid RAM.

6. The suspension system of claim 1 further including a plurality of position sensors, each fluid RAM having an associated position sensor for providing a signal indicative of the position of said piston of said associated RAM, said control means controlling said ram driver means in response to the sensed position of said piston of associated RAMs.

7. The suspension system of claim 1 wherein said sensing means is a pressure sensor operatively connected to at least one of said linear actuators for providing an electrical signal indicative of the fluid pressure in said at least one linear actuator.

8. An apparatus for controlling relative motion between an unsprung mass and a sprung mass, comprising:
   an actuator including a cylinder connected to one of the sprung and unsprung mass and a piston connected to the other of the sprung and unsprung mass and telescopically received in said cylinder, said piston including a piston head dividing said cylinder into a first and a second chamber;
   a first electrically controlled, variable orifice;
   a first accumulator connected to said first chamber of said actuator through said first electrically controlled, variable orifice;
   a source of fluid pressure;
   a first hydraulic ram having a cylinder divided into two chambers with a piston, one fluid chamber in fluid communication with said first accumulator;
   a second accumulator connected to a second chamber of said hydraulic ram;

a pressure regulator connected between said source of fluid pressure and said second accumulator for maintaining a predetermined fluid pressure value in said second accumulator;

a second hydraulic ram having an associated piston connected to the piston associated with said first hydraulic ram, the surface area of the piston of said second hydraulic ram being smaller than the surface area of the piston of said first hydraulic ram;

a second electrically controlled valve for connecting said second hydraulic ram to said source of fluid pressure or to a reservoir;

a first pressure sensor operatively connected to said actuator for providing an electrical signal having a value indicative of the fluid pressure in said actuator;

a second pressure sensor operatively connected to said second accumulator for providing an electrical signal having a value indicative of the fluid pressure in said second accumulator;

a controller connected to said first pressure sensor, said second pressure sensor, and said second electrically controlled valve for maintaining the fluid pressure in the second accumulator equal to the fluid pressure in said first hydraulic ram.

9. The apparatus of claim 8 further including a RAM position sensing means operatively connected to the piston of the first hydraulic RAM for providing a signal indicative of the position of the piston of the first hydraulic ram and wherein said controller is connected to said RAM position sensing means and controls said second electrically controlled valve in response to the sensed position of said piston of said first hydraulic RAM.

10. A semi-active suspension system for a vehicle comprising:

a plurality of hydraulic linear actuators connected between the chassis and an associated wheel;

a plurality of first accumulators, each actuator having an associated first accumulator connected thereto through an associated electrically controlled valve;

a plurality of linear hydraulic motors, each first accumulator having an associated hydraulic motor for pressurizing such accumulator, each linear hydraulic motor having a first variable volume chamber in communication with an associated accumulator and a second variable volume chamber;

a second accumulator connected to the second variable volume chamber of each said hydraulic motor so as to provide a common back pressure and thereby connecting each of the second variable volume chambers of each of the hydraulic motors together;

means for pressurizing said second accumulator to a desired pressure;

means for sensing force inputs to the vehicle; and means for controlling movement of each linear hydraulic motor in response to the sensed force inputs.

11. A method or controlling a vehicle suspension system having hydraulic actuators located at each wheel corner, an associated linear hydraulic RAM at each corner for pressurizing its associated actuator, an associated accumulator at each corner connected to its associated actuator through an associated electrically controlled valve, and a common accumulator connected to a back pressure side of each hydraulic RAM, said method comprising the steps of:

monitoring the pressure in each of the actuators, the pressure in the actuators being indicative of force inputs to the vehicle;

averaging the monitored actuator pressures;

monitoring the back pressure in the RAMs;

varying the back pressure until it equals the average actuator pressure;

monitoring force inputs to the vehicle; and varying, if necessary, actuator pressure and back pressure in response to the sensed force inputs to thereby alter the effect of the force inputs.

* * * * *